United States Patent
Kim

(10) Patent No.: US 11,733,754 B2
(45) Date of Patent: Aug. 22, 2023

(54) ELECTRONIC DEVICE FOR POWER MANAGEMENT, AND OPERATION METHOD THEREFOR

(71) Applicant: Samsung Electronics Co., Ltd., Suwon-si (KR)

(72) Inventor: Shinho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/672,102

(22) Filed: Feb. 15, 2022

(65) Prior Publication Data

US 2022/0171445 A1 Jun. 2, 2022

Related U.S. Application Data

(63) Continuation of application No. PCT/KR2020/010357, filed on Aug. 5, 2020.

(30) Foreign Application Priority Data

Aug. 19, 2019 (KR) .......................... 10-2019-0101348

(51) Int. Cl.
  *G06F 1/26* (2006.01)
  *G06F 13/42* (2006.01)
  (Continued)

(52) U.S. Cl.
  CPC .............. *G06F 1/266* (2013.01); *G06F 1/263* (2013.01); *G06F 1/28* (2013.01); *G06F 1/30* (2013.01);
  (Continued)

(58) Field of Classification Search
  CPC . G06F 1/26; G06F 1/263; G06F 1/266; G06F 1/28; G06F 1/30; G06F 1/3203;
  (Continued)

(56) References Cited

U.S. PATENT DOCUMENTS

2013/0181539 A1* 7/2013 Muratov ................. H01F 38/14
                                                              307/104
2015/0134983 A1   5/2015 Samorukov et al.
(Continued)

FOREIGN PATENT DOCUMENTS

KR  10-2010-0000347 A  1/2010
KR  10-2013-0074483 A  7/2013
(Continued)

*Primary Examiner* — Thomas J. Cleary
(74) *Attorney, Agent, or Firm* — Jefferson IP Law, LLP

(57) ABSTRACT

A device and a method for power management of an electronic device are provided. The electronic device includes a battery, at least one internal circuit, a universal serial bus (USB) connector, and at least one processor operably connected to the at least one internal circuit and the USB connector, wherein the at least one processor can supply power to an external electronic device connected through the USB connector, identify the input voltage of the at least one internal circuit, determine whether to change a power supply method based on the identified input voltage if the identified input voltage is less than or equal to a reference voltage, and change the power supply method of the external electronic device if the power supply method is determined to be changed.

14 Claims, 8 Drawing Sheets

(51) Int. Cl.
*G06F 1/28* (2006.01)
*G06F 1/30* (2006.01)

(52) U.S. Cl.
CPC .. *G06F 13/4282* (2013.01); *G06F 2213/0042* (2013.01)

(58) Field of Classification Search
CPC .... G06F 1/3206; G06F 1/3212; G06F 1/3246; G06F 1/325; G06F 1/3296; G06F 13/4282; G06F 2213/0042; G06F 2213/3812
See application file for complete search history.

(56) References Cited

U.S. PATENT DOCUMENTS

| | | | |
|---|---|---|---|
| 2015/0188325 A1* | 7/2015 | Wagner | H02J 7/0068 307/31 |
| 2018/0120910 A1* | 5/2018 | Farkas | G06F 1/26 |
| 2018/0131148 A1* | 5/2018 | Liu | G05B 15/02 |
| 2018/0358821 A1 | 12/2018 | Li | |
| 2019/0064900 A1 | 2/2019 | Lee et al. | |
| 2019/0319545 A1* | 10/2019 | Wang | H01R 13/70 |
| 2021/0351716 A1* | 11/2021 | Richards | H02J 7/0045 |

FOREIGN PATENT DOCUMENTS

| | | |
|---|---|---|
| KR | 10-1479582 B1 | 1/2015 |
| KR | 10-1725905 B1 | 4/2017 |
| KR | 10-2019-0021768 A | 3/2019 |

* cited by examiner

ELECTRONIC DEVICE FOR POWER MANAGEMENT, AND OPERATION METHOD THEREFOR

CROSS-REFERENCE TO RELATED APPLICATION(S)

This application is a continuation application, claiming priority under § 365(c), of an International application No. PCT/KR2020/010357, filed on Aug. 5, 2020, which is based on and claims the benefit of a Korean patent application number 10-2019-0101348, filed on Aug. 19, 2019, in the Korean Intellectual Property Office, the disclosure of which is incorporated by reference herein in its entirety.

BACKGROUND

1. Field

The disclosure relates to a method and an apparatus for managing power in an electronic device. More particularly, the disclosure relates to a universal serial bus (USB) interface that connects an electronic device and an external electronic device, where the electronic device may supply data and/or power to the external electronic device via the USB.

2. Description of Related Art

An electronic device uses, as a power source, a battery that has a limited power capability based on mobility and portability for a user. The usage time of the electronic device may be limited due to the limited power capability of the battery.

An electronic device, such as a smartphone and a tablet personal computer (PC) that is equipped with a battery may experience an instantaneous power drop due to the limited power capability of the battery. For example, the instantaneous power drop may occur based on at least one of an unexpected increase in a load current, an electrical shock from the outside, such as electrostatic discharge (ESD), or electromagnetic interference (EMI) with respect to the system of an electronic device. The instantaneous power drop may be referred to as a sudden momentary power loss (SMPL).

The above information is presented as background information only to assist with an understanding of the disclosure. No determination has been made, and no assertion is made, as to whether any of the above might be applicable as prior art.

SUMMARY

A universal serial bus (USB) is an interface that connects an electronic device and an external electronic device, and the electronic device may supply data and/or power to the external electronic device via the USB. For example, the electronic device may supply power to the external electronic device based on the USB power delivery (PD) standard.

When the electronic device operates as a host device, the system of the electronic device itself consumes power and communication with an external electronic device using a USB interface and supplying power to an external electronic device may consume power and thus, the amount of power consumed by the electronic device may increase. The probability of an instantaneous power drop may increase when the amount of power consumed by the electronic device increases. When an instantaneous power drop occurs, the system of the electronic device may be reset, or the power of the electronic device may be abruptly blocked (power off).

Aspects of the disclosure are to address at least the above-mentioned problems and/or disadvantages and to provide at least the advantages described below. Accordingly, an aspect of the disclosure is to provide an apparatus and a method for preventing an instantaneous power drop in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a battery, at least one internal circuit, a universal serial bus (USB) connector, and at least one processor operatively connected to the at least one internal circuit and the USB connector, and the at least one processor is configured to supply power to an external electronic device connected via the USB connector, identify an input voltage of the at least one internal circuit, if the input voltage is identified as being less than or equal to a reference voltage, determine whether to change a power supplying scheme based on the identified input voltage, and, if it is determined to change the power supplying scheme, change the power supplying scheme for the external electronic device.

In accordance with another aspect of the disclosure, a method of operating an electronic device is provided. The method includes supplying power to an external electronic device connected via a USB connector, identifying an input voltage of at least one internal circuit included in the electronic device, determining whether to change a power supplying scheme based on the identified input voltage if the input voltage is identified as being less than or equal to a reference voltage, and changing a power supplying scheme for the external electronic device if it is determined to change the power supplying scheme.

According to various embodiments of the disclosure, when it is determined that an instantaneous power drop may occur based on a result of monitoring the input voltage of at least one internal circuit, an electronic device may change a power supplying scheme for an external electronic device connected via a USB, so as to prevent an instantaneous power drop of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
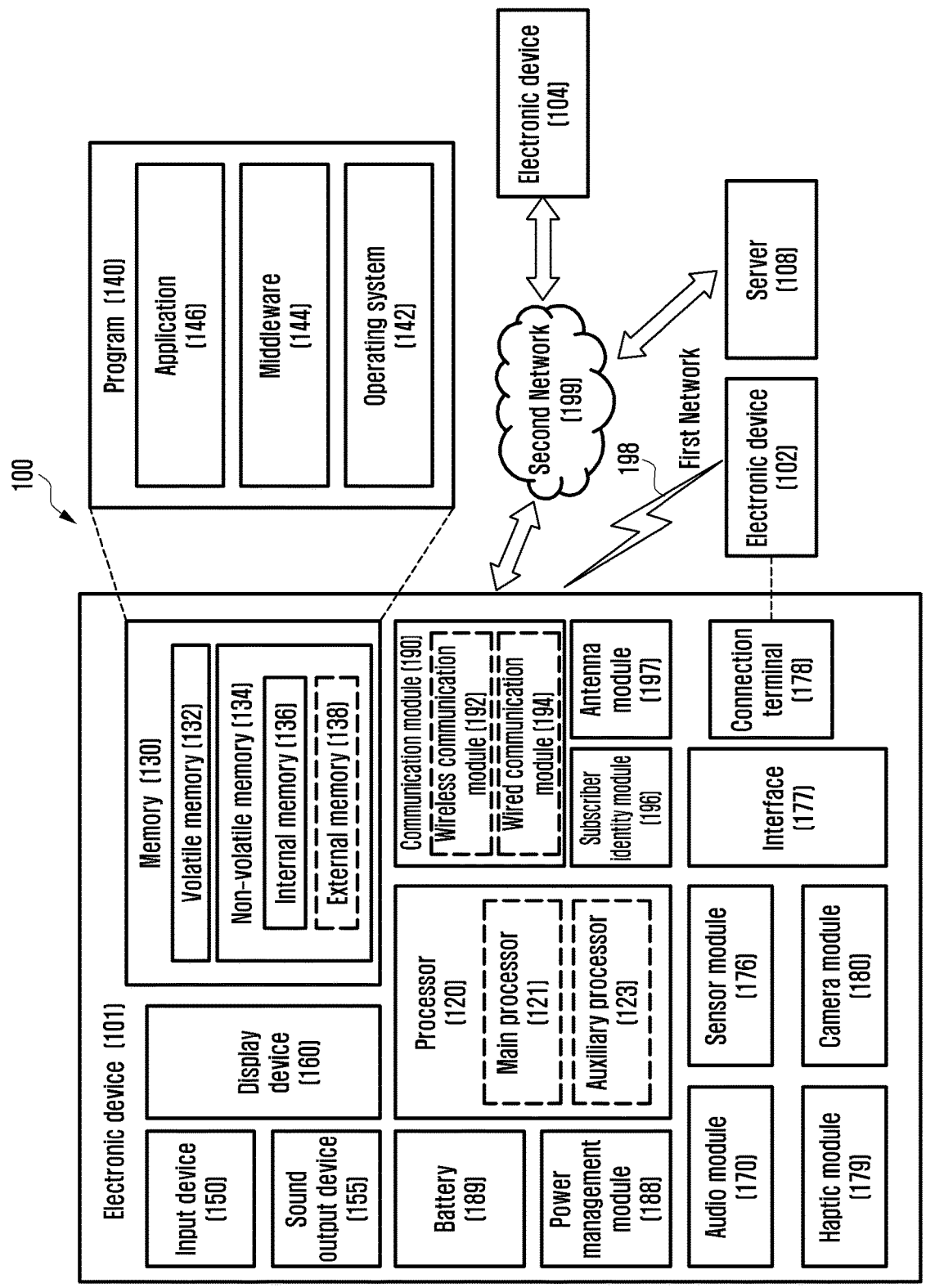
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the external electronic device 102). According to an embodiment of the disclosure, the connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
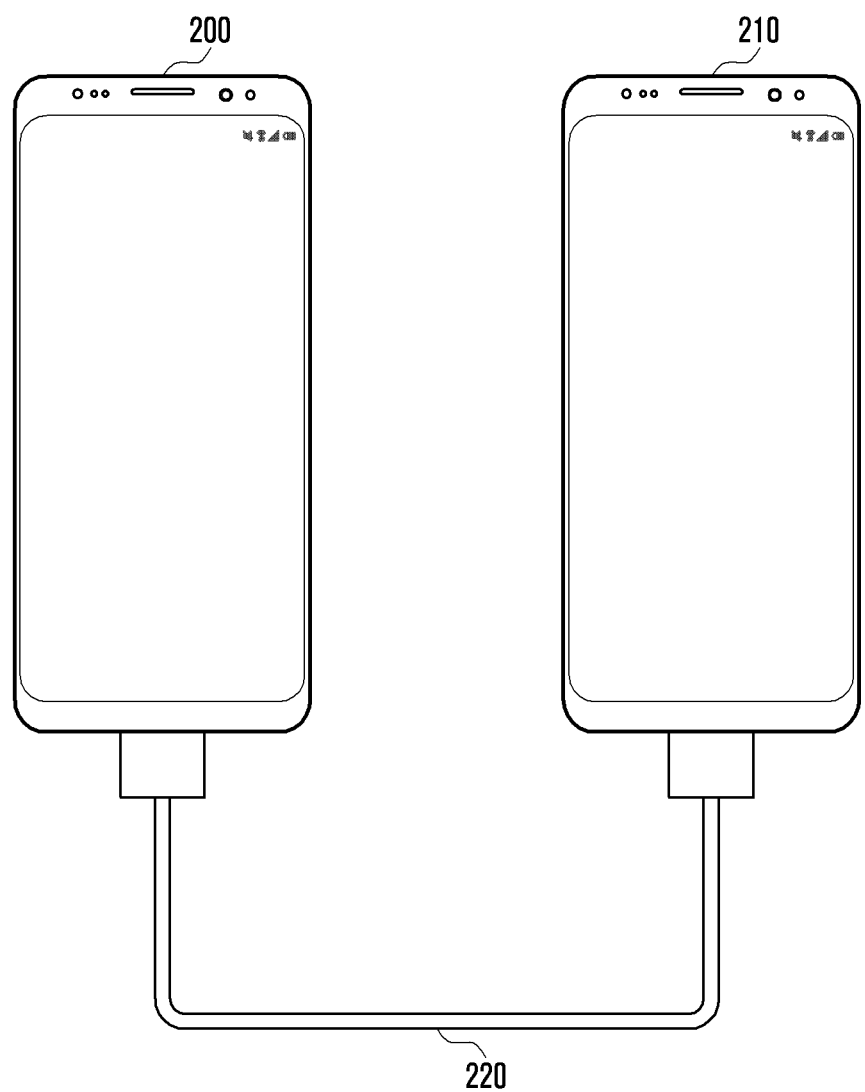
FIG. 2 is a diagram illustrating an electronic device connected via a universal serial bus (USB) according to an embodiment of the disclosure.

FIG. 2 is a diagram illustrating an electronic device connected via a USB according to an embodiment of the disclosure.

Referring to FIG. 2, an electronic device 200 may include various embodiments of an electronic device which is at least partially similar to the electronic device 101 of FIG. 1.

An external electronic device 210 may be configured to be identical or to be at least partially similar to the electronic device 200.

The electronic device 200 may be connected to the external electronic device 210 via a cable 220 (e.g., a USB cable). According to an embodiment of the disclosure, the electronic device 200 may be electrically connected to the external electronic device 210 via the cable 220 that is connected to a universal serial bus (USB) connection terminal. The electronic device 200 and the external electronic device 210 may support bidirectionality of at least one of data or power via the cable 220. For example, the cable may support a type-C USB.

Figure 3:
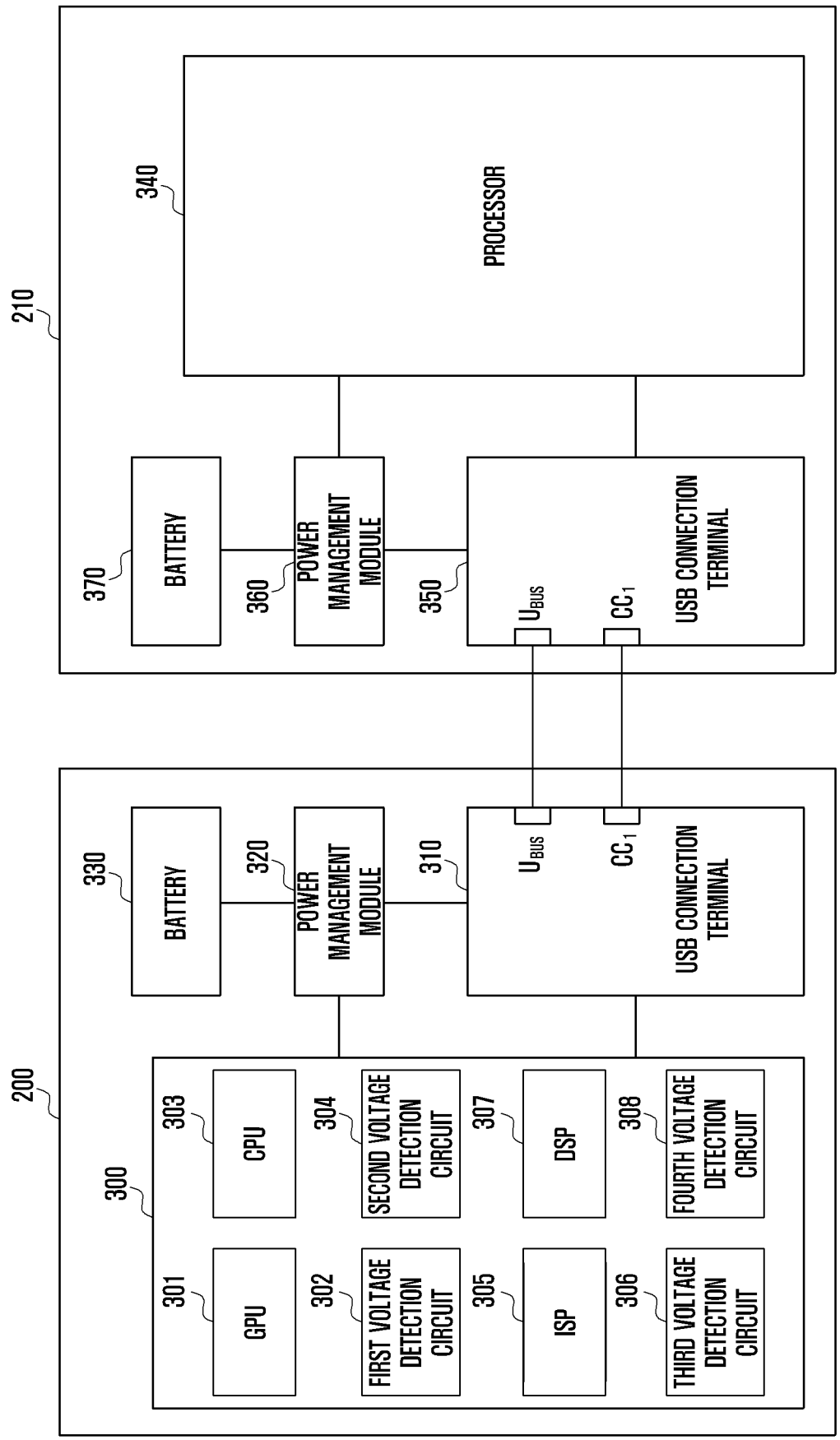
FIG. 3 is a block diagram of an electronic device for preventing an instantaneous power drop according to an embodiment of the disclosure.

FIG. 3 is a block diagram of an electronic device for preventing an instantaneous power drop according to an embodiment of the disclosure.

Referring to FIG. 3, according to various embodiments of the disclosure, the electronic device 200 may include a processor 300, a USB connection terminal 310, a power management module 320, and a battery 330. According to an embodiment of the disclosure, the processor 300 may be substantially the same as the processor 120 of FIG. 1, or may be included in the processor 120. The USB connection terminal 310 may be substantially the same as the connection terminal 178 of FIG. 1, or may be included in the connection terminal 178. The power management module 320 may be substantially the same as the power management module 188 of FIG. 1, or may be included in the power management module 188. The battery 330 may be substantially the same as the battery 189 of FIG. 1, or may be included in the battery 189.

According to various embodiments of the disclosure, the external electronic device 210 may include a processor 340, a USB connection terminal 350, a power management module 360, and a battery 370. According to an embodiment of the disclosure, the processor 340 may be substantially the same as the processor 120 of FIG. 1, or may be included in the processor 120. The USB connection terminal 350 may be substantially the same as the connection terminal 178 of FIG. 1, or may be included in the connection terminal 178. The power management module 360 may be substantially the same as the power management module 188 of FIG. 1, or may be included in the power management module 188. The battery 370 may be substantially the same as the battery 189 of FIG. 1, or may be included in the battery 189.

According to various embodiments of the disclosure, the USB connection terminal 310 of the electronic device 200 may be connected to the USB connection terminal 350 of the external electronic device 210 via the cable 220 of FIG. 2. According to an embodiment of the disclosure, the USB connection terminals 310 and 350 may recognize connection of the cable 220 (e.g., a USB port) via a configuration channel (CC) pin (e.g., CC1 pin or CC2 pin). The electronic device 200 may recognize connection of the cable 220 based on at least one of a voltage, a current, or an impedance detected by a CC pin (e.g., CC1 pin or CC2 pin) of the USB connection terminal 310.

According to an embodiment of the disclosure, if a CC pin (e.g., CC1 pin) of the USB connection terminal 310 is connected to an internal pull-up resistance during a predetermined period of time, it is determined that the electronic device 200 is designated as a host device (e.g., a downstream facing port (DFP) device). If a CC pin (e.g., CC1 pin) of the USB connection terminal 350 is connected to an internal pull-down resistance during a predetermined period of time, it is determined that the external electronic device 210 is designated as a slave device (e.g., an upstream facing port (UFP) device).

According to an embodiment of the disclosure, if the electronic device 200 operates as a host device, the electronic device 200 may supply power to the external electronic device 210 via a power supplying terminal (e.g., a VBUS pin) of the USB connection terminal 310. If the external electronic device 210 operates as a slave device, the external electronic device 210 may receive power from the external electronic device 210 via a power reception terminal (e.g., a VBUS pin) of the USB connection terminal 350. For example, the external electronic device 210 may operate an internal circuit using power supplied from the electronic device 200, or may charge the battery 370.

According to various embodiments of the disclosure, the processor 300 of the electronic device 200 may identify (e.g., a monitor) the input voltage of at least one internal circuit included in the electronic device 200. According to an embodiment of the disclosure, the processor 300 may include at least one element 301, 303, 305, and 307 related to operating at least one internal circuit. The processor 300 may identify (e.g., monitor) the input voltage of each element 301, 303, 305, and 307 using a voltage detection circuit 302, 304, 306 and 308 corresponding to each element 301, 303, 305, and 307. For example, if the input voltage of a predetermined element is decreased, the processor 300 may determine that the input voltage of an internal circuit related to the predetermined element is decreased. The internal circuit may include at least one device among a display (e.g., the display device 160), a touch screen panel (TSP) (e.g., the display device 160 of FIG. 1), a camera (e.g., the camera module 180 of FIG. 1), or an RF module (e.g., the wireless communication module 192 of FIG. 1) included in the electronic device 101. The element 301, 303, 305, and 307 may include an intellectual property (IP) related to driving of each internal circuit in the processor 300. For example, the IP related to driving of the internal circuit may include at least one of the graphics processing unit (GPU) 301, the central processing unit (CPU) 303, the image signal processor (ISP) 305, or the digital signal processor (DSP) 307. The GPU 301 may process a 2-dimensional or 3-dimensional graphic (e.g., an image) for displaying on a display (e.g., the display device 160). The CPU 303 may control driving of an operating system or an application program. The ISP 305 may process information (e.g., an image) collected via the camera module 180. The DSP 307 is to convert an analog signal into a digital signal so as to improve a processing speed, and may process a multimedia content, such as images and videos in addition to sound. For example, the voltage detection circuit 302, 304, 306, and 308 may include a droop detector.

According to various embodiments of the disclosure, the processor 300 of the electronic device 200 may determine whether it is the situation in which an instantaneous voltage drop may occur based on the input voltage of at least one internal circuit. For example, the situation in which an instantaneous voltage drop may occur may be determined based on a result of monitoring the input voltage of at least one internal circuit.

According to an embodiment of the disclosure, if a voltage less than or equal to a reference voltage is detected by the at least one voltage detection circuit 302, 304, 306, and 308, the processor 300 may calculate the amount of power consumed by the electronic device 200. For example, based on the power capability of the battery 330, the processor 300 may determine whether the amount of power consumed by the electronic device 200 is in a level that affects the voltage of the entire system of the electronic device 200. If it is determined that the amount of power consumed is in a level that affects the voltage of the entire system, the processor 300 may determine that it is the situation in which an instantaneous voltage drop may occur.

According to an embodiment of the disclosure, based on the number of voltage detection circuits 302, 304, 306, and/or 308 that detect a voltage less than or equal to the reference voltage, the processor 300 may determine whether it is the situation in which an instantaneous voltage drop may occur. For example, if a voltage level less than or equal to the reference voltage is detected, the voltage detection circuits 302, 304, 306, and/or 308 may produce a detection signal (e.g., an interrupt signal). Based on the number of detection signals produced during a reference time, the processor 300 may identify the number of voltage detection circuits 302, 304, 306, and/or 308 that detect an input voltage less than or equal to the reference voltage.

According to various embodiments of the disclosure, if it is determined that it is the situation in which an instantaneous voltage drop may occur, the processor 300 of the electronic device 200 may change a power supplying scheme for the external electronic device 210. The electronic device 200 may change a power supplying scheme within (e.g., approximately 3 us) a period of time (e.g., approximately 4 to 7 us) that may be spent until the occurrence of an instantaneous voltage drop, so as to prevent an instantaneous voltage drop. For example, if the processor 300 is connected to the external electronic device 210 equipped with an embedded battery, the processor 300 may change a power supplying scheme in order to prevent an instantaneous voltage drop.

According to an embodiment of the disclosure, if it is determined that it is the situation in which an instantaneous voltage drop may occur, the processor 300 may change, to the external electronic device 210, a subject that supplies power. For example, if it is determined that it is the situation in which an instantaneous voltage drop may occur, the processor 300 may transmit a warning signal (e.g., an interrupt request signal (IRQ)) to the USB connection terminal 310. Based on the warning signal, the USB connection terminal 310 may transmit, to the external electronic device 210 via at least one of a plurality of pins, a request signal for changing a subject that supplies power (or a request signal for changing a power supplying scheme). If a change approval signal is received from the external electronic device 210, the USB connection terminal 310 may block power supplied to the external electronic device 210, and may receive power from the external electronic device 210. By changing the subject that supplies power, the electronic device 200 may receive power from the external electronic device 210, and may stabilize the entire system voltage of the electronic device 200. In this instance, a role related to USB communication between the electronic device 200 and the external electronic device 210 may be maintained. That is, the electronic device 200 may be changed to a slave device related to supplying of power by maintaining as a host device (or the function of a host device) related to USB data communication. For example, via a CC pin (e.g., CC1 pin) or a side band use (SBU) pin based on a baseboard management controller (BMC) protocol, the USB connection terminal 310 may transmit a request signal for changing a subject that supplies power.

According to an embodiment of the disclosure, if it is determined that it is the situation in which an instantaneous voltage drop may occur, the processor 300 may block power supplied to the external electronic device 210. For example, if it is determined that it is the situation in which an instantaneous voltage drop may occur, the processor 300 may transmit a warning signal (e.g., an interrupt request signal (IRQ)) to the USB connection terminal 310. The USB connection terminal 310 may control, based on the warning signal, the power management module 320 so as to block power supplied to the external electronic device 210.

According to various embodiments of the disclosure, if it is determined that a system voltage is stabilized, the processor 300 of the electronic device 200 may change a power supplying scheme. According to an embodiment of the disclosure, if it is determined that the system voltage of the electronic device 200 is stabilized, the processor 300 may restore a subject that supplies power. For example, if it is determined that the system voltage of the electronic device 200 is stabilized, the processor 300 may transmit a change request signal (e.g., an interrupt request signal) to the USB connection terminal 310. Based on the change request signal, the USB connection terminal 310 may transmit a request signal for changing a subject that supplies power, to the external electronic device 210 via at least one of a plurality of pins. If a change approval signal is received from the external electronic device 210, the USB connection terminal 310 may supply, to the external electronic device 210, power supplied from the power management module 320. For example, based on whether the amount of power consumed by the electronic device 200 is in a level that affects the voltage of the entire system of the electronic device 200, the processor 300 may determine whether the system voltage of the electronic device 200 is stabilized. As another example, based on the number of voltage detection circuits 302, 304, 306, and 308 that detect an input voltage less than or equal to the reference voltage, the processor 300 may determine whether the system voltage of the electronic device 200 is stabilized.

According to an embodiment of the disclosure, if it is determined that the system voltage of the electronic device 200 is stabilized, the processor 300 may resume supplying power to the external electronic device 210. For example, if it is determined that the system voltage of the electronic device 200 is stabilized, the processor 300 may transmit a power supplying resume signal (e.g., an interrupt request signal) to the USB connection terminal 310. Based on the power supplying resume signal, the USB connection terminal 310 may resume supplying power to the external electronic device 210.

According to various embodiments of the disclosure, an electronic device (e.g., the electronic device 101 of FIG. 1) or the electronic device 200 of FIG. 2) may include a battery (e.g., the battery 189 of FIG. 1 or the battery 330 of FIG. 3), at least one internal circuit, a universal serial bus (USB) connector (e.g., the connection terminal 178 of FIG. 1 or the USB connection terminal 310 of FIG. 3), and a processor (e.g., the processor 120 of FIG. 1 or the processor 300 of FIG. 3) operatively connected to the at least one internal circuit and the USB connector, and the processor is configured to supply power to an external electronic device (e.g., the external electronic device 210 of FIG. 2) connected via the USB connector, to monitor an input voltage of the at least one internal circuit, to determine whether to change a power supplying scheme based on a detected input voltage if an input voltage less than or equal to a reference voltage is detected via the monitoring, and to change the power supplying scheme for the external electronic device if it is determined to change the power supplying scheme.

According to various embodiments of the disclosure, when the power supplying scheme for the external electronic device is changed, the processor maintains a data communication scheme for the external electronic device.

According to various embodiments of the disclosure, the USB connector supports a type-C USB.

According to various embodiments of the disclosure, if the processor determines to change the power supplying scheme, the USB connector may transmit a request signal for changing the power supplying scheme to the external electronic device via a first pin among pins of the USB connector, and may change, to the external electronic device, a subject that supplies power if a response signal is received via the first pin in response to the request signal.

According to various embodiments of the disclosure, the first pin may include a configuration channel (CC) pin or a side band use (SBU) pin.

According to various embodiments of the disclosure, if the processor determines to change the power supplying scheme, the processor may block power supplied to the external electronic device, and may receive power from the external electronic device.

According to various embodiments of the disclosure, the processor may include at least one element related to driving of the at least one internal circuit, and at least one voltage detection circuit that monitors an input voltage of each element.

According to various embodiments of the disclosure, based on the number of voltage detection circuits that detect an input voltage less than a reference voltage among the at least one voltage detection circuit, the processor may determine whether to change the power supplying scheme.

According to various embodiments of the disclosure, if the power supplying scheme is changed, the processor may monitor an input voltage of the at least one internal circuit, may determine, based on a result of the monitoring, whether to change the power supplying scheme, and, if it is determined to change the power supplying scheme, may change, to the electronic device, a subject that supplies power.

According to various embodiments of the disclosure, the external electronic device may include a rechargeable battery.

Figure 4:
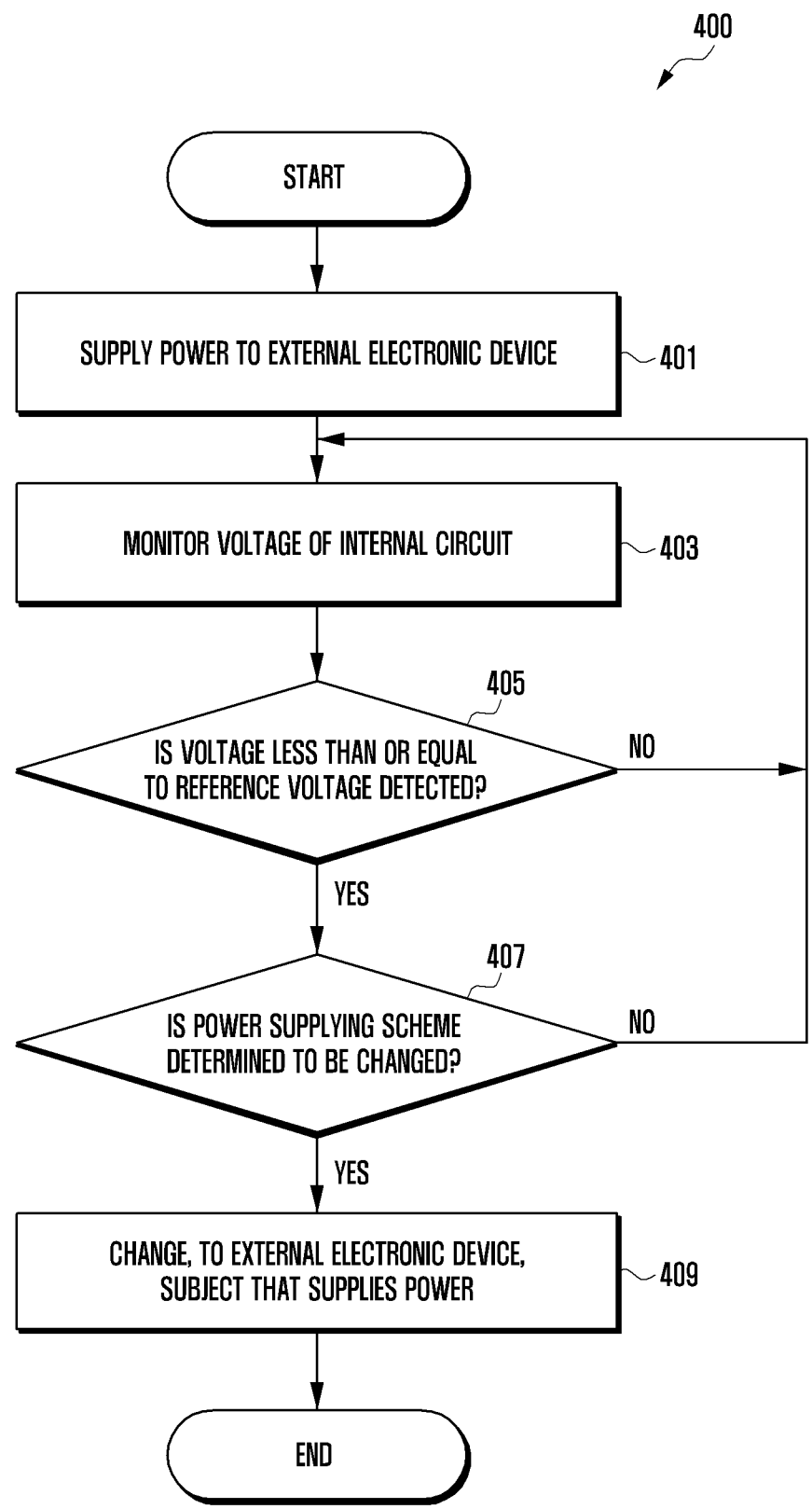
FIG. 4 is a flowchart illustrating a process of changing a power supplying scheme by an electronic device according to an embodiment of the disclosure.

FIG. 4 is a flowchart 400 illustrating a process of changing a power supplying scheme by an electronic device according to an embodiment of the disclosure.

In the embodiment provided hereinafter, operations may be performed sequentially, but it is not necessarily. For example, the order of operations may be changed, and at least two operations may be performed in parallel. Here, the electronic device may be the electronic device 101 of FIG. 1 or the electronic device 200 of FIG. 2 or FIG. 3.

Referring to FIG. 4, according to various embodiments of the disclosure, an electronic device (e.g., the processor 120 of FIG. 1, the connection terminal 178, the processor 300 of FIG. 3, or the USB connection terminal 310) may supply power to an external electronic device connected via a USB cable in operation 401. According to an embodiment of the disclosure, if the electronic device 200 is set as a host device, the electronic device 200 may supply power to an external electronic device (e.g., the external electronic device 102 of FIG. 1 or the external electronic device 210 of FIG. 2 or FIG. 3) connected to a USB connection terminal 310 via a USB cable.

According to various embodiments of the disclosure, the electronic device (the processor 120 or 300) may monitor (e.g., identify) the input voltage of at least one internal circuit included in the electronic device in operation 403.

According to an embodiment of the disclosure, the processor 300 may monitor the input voltage of each element 301, 303, 305, and 307 using at least one voltage detection circuit 302, 304, 306 and 308 corresponding to at least one element 301, 303, 305, and 307 (e.g., IP). For example, if a voltage less than or equal to a reference voltage is detected, the voltage detection circuit 302, 304, 306, and 308 may produce an interrupt signal.

According to various embodiments of the disclosure, the electronic device (the processor 120 or 300) may identify whether an input voltage less than or equal to the reference voltage is detected among the input voltage of at least one internal circuit in operation 405. According to an embodiment of the disclosure, the processor 300 may identify whether an interrupt signal is provided from at least one voltage detection circuit 302, 304, 306, and 308.

According to various embodiments of the disclosure, if an input voltage less than or equal to the reference voltage is detected (e.g., 'Yes' in operation 405), the electronic device (e.g., the processor 120 or 300) may determine whether to change a power supplying scheme. According to an embodiment of the disclosure, if the number of voltage detection circuits 302, 304, 306, and/or 308 that detect a voltage less than or equal to the reference voltage exceeds a reference number, the processor 300 may determine whether it is the situation in which an instantaneous voltage drop may occur. If it is determined that it is the situation in which an instantaneous voltage drop may occur, the processor 120 may determine to change the power supplying scheme in order to prevent an instantaneous voltage drop. According to an embodiment of the disclosure, based on a voltage level detected by at least one voltage detection circuit 302, 304, 306, and 308 and the output voltage of the power management module 188, the processor 120 may calculate the amount of power consumed by the electronic device 101. If it is determined that the amount of power consumed by the electronic device 101 affects the voltage of the entire system of the electronic device 101, the processor 120 may determine to change the power supplying scheme.

According to various embodiments of the disclosure, if an input voltage less than or equal to the reference voltage is not detected (e.g., 'No' in operation 405) or if it is determined to maintain the power supplying scheme (e.g., 'No' in operation 407), the electronic device (e.g., the processor 120 or 300) may monitor (e.g., identify) the input voltage of at least one internal circuit in operation 403. According to an embodiment of the disclosure, if an interrupt signal provided from the voltage detection circuit 302, 304, 306, and 308 is not detected, the processor 120 may determine that an input voltage less than or equal to the reference voltage is not detected.

According to various embodiments of the disclosure, if it is determined to change the power supplying scheme (e.g., 'Yes' in operation 407), the electronic device (e.g., the processor 120 or 300, the connection terminal 178, or the USB connection terminal 310) may change a subject that supplies power, to the external electronic device connected via a USB cable in operation 409. According to an embodiment of the disclosure, if it is determined to change a subject that supplies power, the processor 300 may transmit an interrupt request signal (IRQ) to the USB connection terminal 310. Based on the interrupt request signal, the USB connection terminal 310 may change, to the external electronic device (e.g., the external electronic device 102 of FIG. 1), the subject that supplies power.

According to various embodiments of the disclosure, in the case of changing the power supplying scheme for the external electronic device connected via a USB cable, the electronic device 101 or 200 may maintain a USB data communication scheme (e.g., a communication subject) for the external electronic device. That is, the electronic device 101 or 200 may operate as a slave device in association with supplying of power and may operate as a host device related to USB communication.

Figure 5:
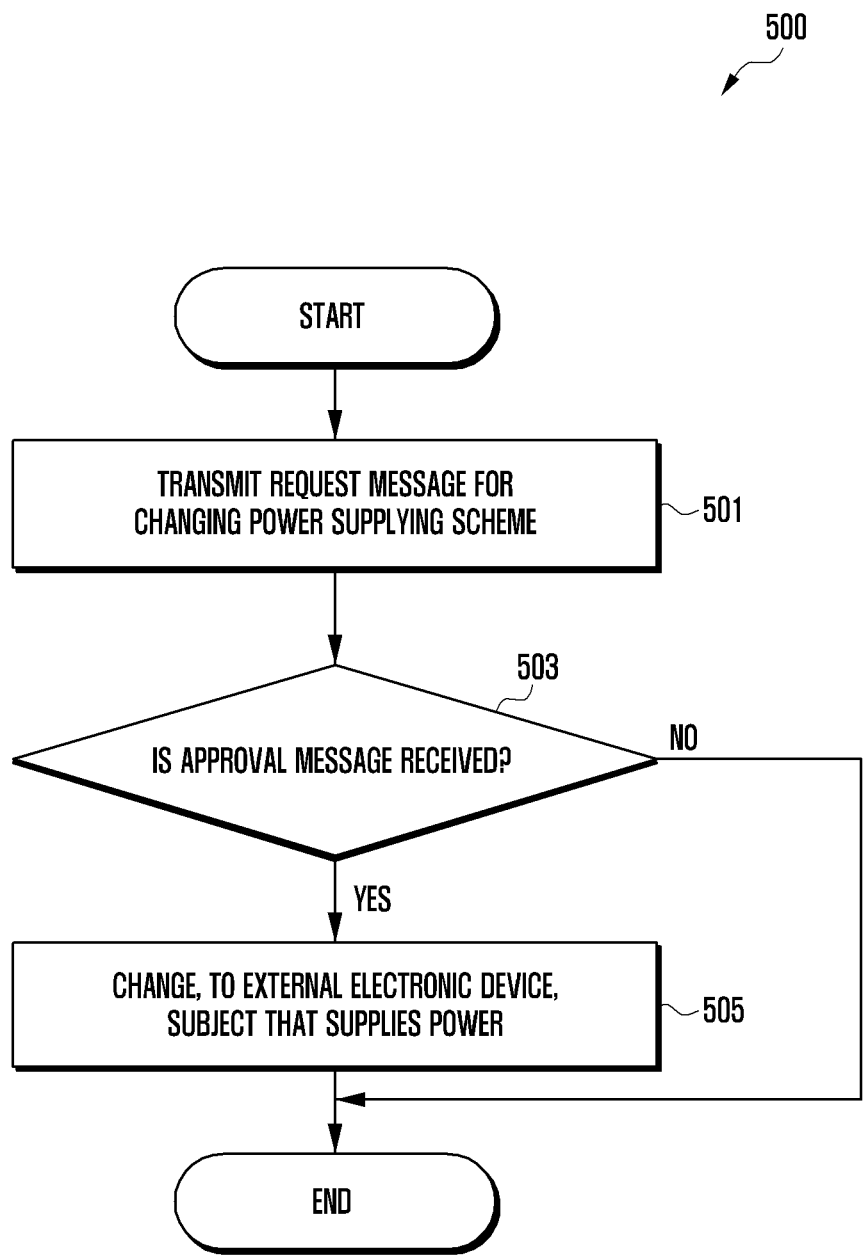
FIG. 5 is a flowchart illustrating a process of changing a subject that supplies power, by an electronic device according to an embodiment of the disclosure.

FIG. 5 is a flowchart 500 illustrating a process of changing a power supplying scheme by an electronic device according to an embodiment of the disclosure.

Operations of FIG. 5 which are described below may be operations subsequent to operation 409 of FIG. 4. In the embodiment provided hereinafter, operations may be performed sequentially, but not necessarily. For example, the order of operations may be changed, and at least two operations may be performed in parallel. Here, the electronic device may be the electronic device 101 of FIG. 1 or the electronic device 200 of FIG. 2 or FIG. 3.

Referring to FIG. 5, according to various embodiments of the disclosure, if it is determined to change a power supplying scheme (e.g., 'Yes' in operation 407 of FIG. 4), the electronic device (e.g., the processor 120 of FIG. 1, the connection terminal 178, the processor 300 of FIG. 3, or the USB connection terminal 310) may transmit a request message for changing a power supplying scheme to an external electronic device that is connected to the electronic device via a USB and receives power in operation 501. According to an embodiment of the disclosure, if an interrupt request signal (IRQ) related to changing of a power supplying scheme is received from the processor 300, the USB connection terminal 310 may transmit, based on a BMC protocol, a request signal for changing a power supplying scheme to the external electronic device (e.g., the external electronic device 102 of FIG. 1). For example, the USB connection terminal 310 may transmit a request signal for changing a power supplying scheme via a CC pin (e.g., CC1 pin) or an SBU pin among pins of a type-C USB.

According to various embodiments of the disclosure, the electronic device (e.g., the processor 120 or 300, the connection terminal 178, or the USB connection terminal 310) may identify whether an approval message is received in response to the request signal in operation 503. According to an embodiment of the disclosure, the USB connection terminal 310 may identify whether an approval signal that approves of changing of the power supplying scheme is received in response to the request signal. For example, the USB connection terminal 310 may receive an approval signal via a CC pin (e.g., CC1 pin) or an SBU pin among pins of the type-C USB.

According to various embodiments of the disclosure, if the approval message is received (e.g., 'Yes' in operation 503), the electronic device (e.g., the processor 120 or 300, the connection terminal 178, or the USB connection terminal 310) may change, to the external electronic device, a subject that supplies power in operation 505. According to an embodiment of the disclosure, if the approval signal is received, the USB connection terminal 310 may block power supplied to the external electronic device, and may receive power from the external electronic device. The electronic device 101 or 200 may stabilize the voltage of the system of the electronic device 101 or 200 based on the power supplied from the external electronic device.

Figure 6:
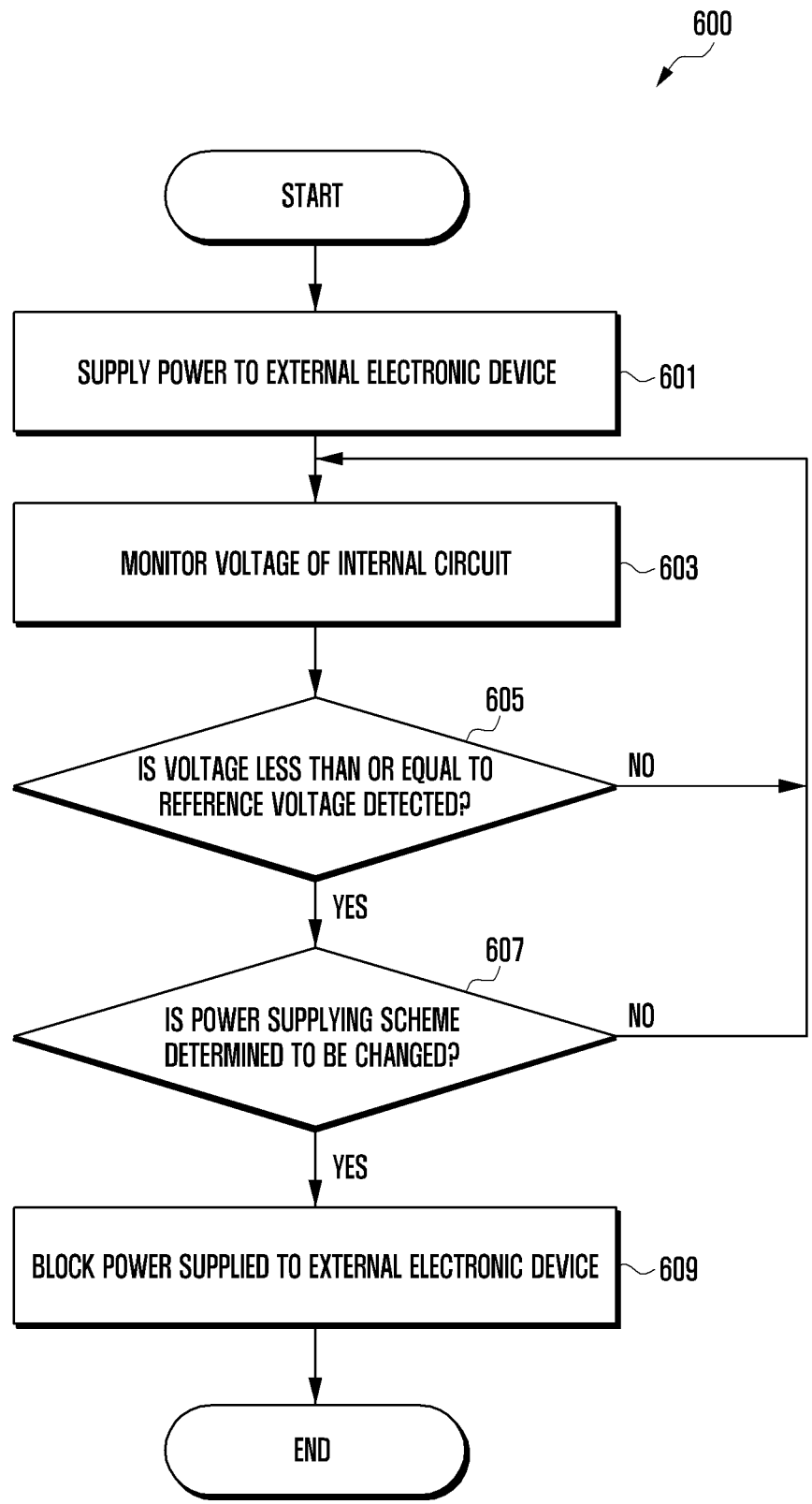
FIG. 6 is a flowchart illustrating a process of blocking power supplied to an external electronic device, by an electronic device according to an embodiment of the disclosure.

FIG. 6 is a flowchart 600 illustrating a process of blocking power supplied to an external electronic device, by an electronic device according to an embodiment of the disclosure.

In the embodiment provided hereinafter, operations may be performed sequentially, but it is not necessarily. For example, the order of operations may be changed, and at least two operations may be performed in parallel. Here, the electronic device may be the electronic device 101 of FIG. 1 or the electronic device 200 of FIG. 2 or FIG. 3.

Referring to FIG. 6, according to various embodiments of the disclosure, an electronic device (e.g., the processor 120 of FIG. 1, the connection terminal 178, the processor 300 of FIG. 3, or the USB connection terminal 310) may supply power to an external electronic device via a USB cable connected to a connection terminal in operation 601. According to an embodiment of the disclosure, if the electronic device 200 is set as a host device, the USB connection terminal 310 may supply power to the external electronic device (e.g., the external electronic device 102 of FIG. 1) via a power supplying terminal (e.g., VBUS).

According to various embodiments of the disclosure, the electronic device (the processor 120 or 300) may monitor (e.g., identify) the input voltage of at least one internal circuit included in the electronic device in operation 603. According to an embodiment of the disclosure, the processor 300 may monitor the input voltage of at least one element 301, 303, 305, and 307 (e.g., an IP) related to driving at least one internal circuit. For example, the processor 300 may identify whether an input voltage less than or equal to a reference voltage is detected using the voltage detection circuit 302, 304, 306, and 308 corresponding to each element 301, 303, 305, and 307.

According to various embodiments of the disclosure, the electronic device (the processor 120 or 300) may identify whether an input voltage less than or equal to the reference voltage is detected based on a monitoring result in operation 605. According to an embodiment of the disclosure, if a voltage level less than or equal to the reference voltage is detected, the voltage detection circuit 302, 304, 306, and 308 may produce an interrupt signal. The processor 300 may identify whether an interrupt signal provided from the at least one voltage detection circuit 302, 304, 306, and 308 is detected.

According to various embodiments of the disclosure, if an input voltage less than or equal to the reference voltage is detected (e.g., 'Yes' in operation 605), the electronic device (e.g., the processor 120 or 300) may determine whether to change a power supplying scheme in operation 607. According to an embodiment of the disclosure, if the number of voltage detection circuits 302, 304, 306, and/or 308 that provides an interrupt signal exceeds a reference number, the processor 300 may determine whether it is the situation in which an instantaneous voltage drop may occur. If it is determined that it is the situation in which an instantaneous voltage drop may occur, the processor 300 may determine to change the power supplying scheme. If it is determined that it is the situation in which the probability of an instantaneous voltage drop is low, the processor 300 may determine to maintain the power supplying scheme.

According to various embodiments of the disclosure, if an input voltage less than or equal to the reference voltage is not detected (e.g., 'No' in operation 605) or if it is determined to maintain the power supplying scheme (e.g., 'No' in operation 607), the electronic device (e.g., the processor 120 or 300) may monitor the input voltage of the at least one internal circuit in operation 603. According to an embodiment of the disclosure, if the number of voltage detection circuits 302, 304, 306, and/or 308 that provides an interrupt signal is less than or equal to the reference number, the processor 300 may determine to maintain the power supplying scheme.

According to various embodiments of the disclosure, if it is determined to change the power supplying scheme (e.g., 'Yes' in operation 607), the electronic device (e.g., the processor 120 or 300, the connection terminal 178, or the USB connection terminal 310) may block power supplied to the external electronic device in operation 609. According to an embodiment of the disclosure, if it is determined to change the power supplying scheme, the processor 300 may transmit an interrupt request signal (IRQ) to the USB connection terminal 310. Based on the interrupt request signal, the USB connection terminal 310 may block power supplied to the external electronic device (e.g., the external electronic device 102 of FIG. 1).

Figure 7:
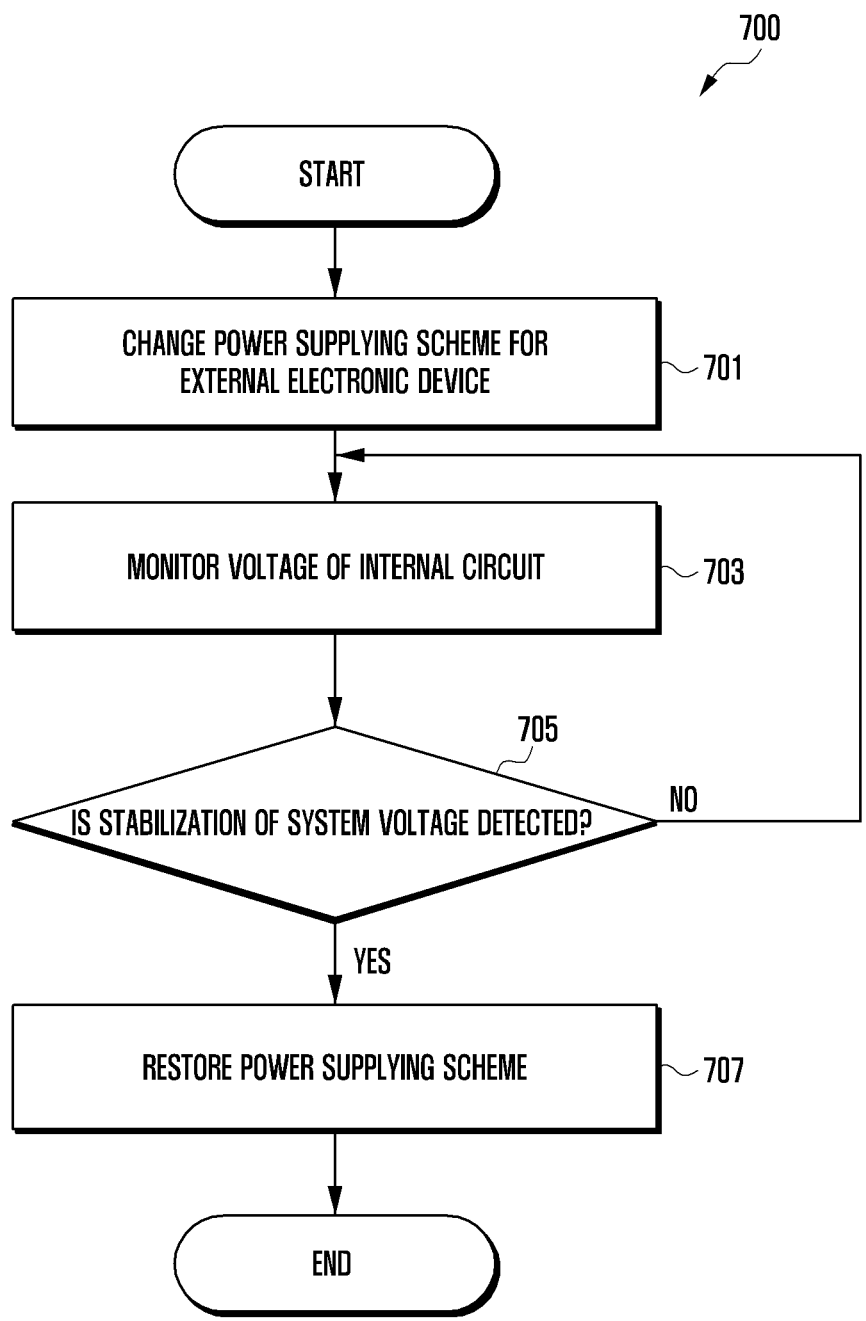
FIG. 7 is a flowchart illustrating a process of restoring a power supplying scheme by an electronic device according to an embodiment of the disclosure.

FIG. 7 is a flowchart 700 illustrating a process of restoring a power supplying scheme by an electronic device according to an embodiment of the disclosure.

In the embodiment provided hereinafter, operations may be performed sequentially, but it is not necessarily. For example, the order of operations may be changed, and at least two operations may be performed in parallel. Here, the electronic device may be the electronic device 101 of FIG. 1 or the electronic device 200 of FIG. 2 or FIG. 3.

Referring to FIG. 7, according to various embodiments of the disclosure, the electronic device (e.g., the processor 120 of FIG. 1, the connection terminal 178, the processor 300 of FIG. 3, or the USB connection terminal 310) may change a power supplying scheme for an external electronic device (e.g., the external electronic device 102 of FIG. 1) connected via a USB cable in operation 701. According to an embodiment of the disclosure, the processor 300 may change, to the external electronic device, a subject that supplies power in order to prevent an instantaneous power drop as described in operations 401 to 409 of FIG. 4. According to an embodiment of the disclosure, the processor 300 may block power supplied to the external electronic device in order to prevent an instantaneous power drop as described in operations 601 to 609 of FIG. 6.

According to various embodiments of the disclosure, the electronic device (the processor 120 or 300) may monitor (e.g., identify) the input voltage of at least one internal circuit included in the electronic device in operation 703. According to an embodiment of the disclosure, the processor 300 may monitor the input voltage of at least one element 301, 303, 305, and 307 (e.g., an IP) which are included in the processor 300 and are related to driving at least one internal circuit. For example, the internal circuit may include at least one among a display (e.g., the display 160), a TSP (e.g., the display device 160), a camera (e.g., the camera module 180), or an RF module (e.g., the wireless communication module 192). The elements 301, 303, 305, and 307 may include at least one among the GPU 301, CPU 303, the ISP 305, or the DSP 307.

According to various embodiments of the disclosure, the electronic device (the processor 120 or 300) may determine whether the voltage of the entire system of the electronic device is stabilized based on a monitoring result in operation 705. According to an embodiment of the disclosure, based on the number of voltage detection circuits 302, 304, 306, and/or 308 that detect a voltage less than or equal to a reference voltage, the processor 300 may determine whether the voltage of the entire system of the electronic device 101 or 200 is stabilized. For example, the number of voltage detection circuits that detect a voltage less than or equal to the reference voltage may be identified based on the number of interrupt signals provided from the voltage detection circuits.

According to various embodiments of the disclosure, if it is determined that the voltage of the entire system of the electronic device is not stabilized ('No' in operation 705) based on a monitoring result, the electronic device (e.g., the processor 120 or 300) may monitor the input voltage of the at least one internal circuit in operation 703. According to an embodiment of the disclosure, if the number of voltage detection circuits that detect a voltage less than or equal to the reference voltage exceeds the reference number, the processor 300 may determine that the voltage of the entire system of the electronic device is not stabilized. That is, the processor 300 may determine that the entire system voltage is unstable and an instantaneous power drop may occur.

According to various embodiments of the disclosure, if it is determined that the voltage of the entire system of the electronic device is stabilized based on a monitoring result (e.g., 'Yes' in operation 705), the electronic device (e.g., the processor 120 or 300, the connection terminal 178, or the USB connection terminal 310) may restore a power supplying scheme for the external electronic device in operation 707. According to an embodiment of the disclosure, if the number of voltage detection circuits that detect a voltage less than or equal to the reference voltage is less than or equal to the reference number, the processor 300 may determine that the voltage of the entire system of the electronic device is stabilized. That is, the processor 300 may determine that the probability of an instantaneous power drop is low. According to an embodiment of the disclosure, if it is determined that the probability of an instantaneous power drop is low, the USB connection terminal 310 may restore a subject that supplies power from the external electronic device. For example, the USB connection terminal 310 may change the electronic device 200 to a host device, and may supply power to the external electronic device. According to an embodiment of the disclosure, if it is determined that the probability of an instantaneous power drop is low, the USB connection terminal 310 may resume supplying power to the external electronic device.

Figure 8:
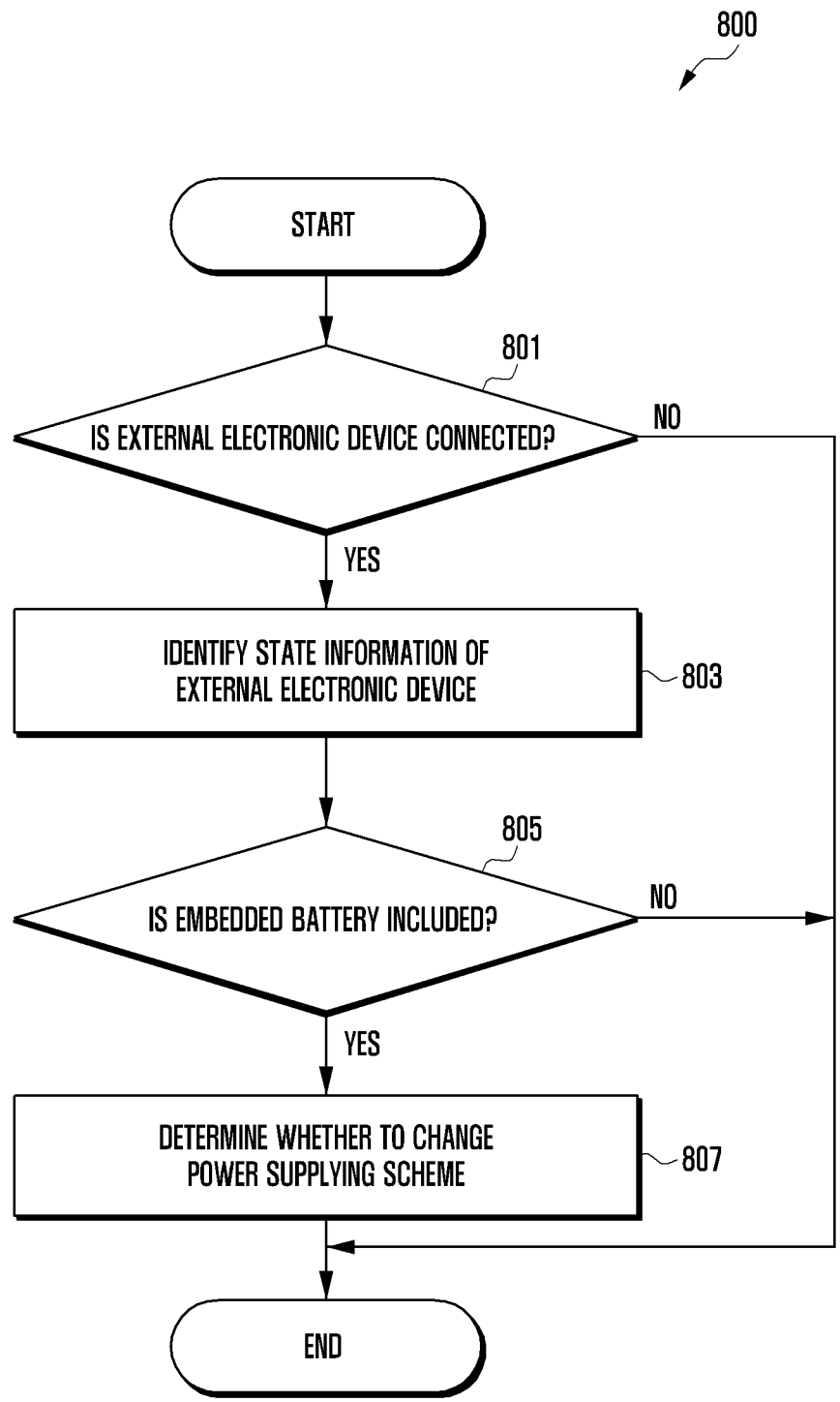
FIG. 8 is a flowchart illustrating a process of selectively changing a power supplying scheme by an electronic device according to an embodiment of the disclosure.

FIG. 8 is a flowchart 800 illustrating a process of selectively changing a power supplying scheme by an electronic device according to an embodiment of the disclosure.

In the embodiment provided hereinafter, operations may be performed sequentially, but it is not necessarily. For example, the order of operations may be changed, and at least two operations may be performed in parallel. Here, the electronic device may be the electronic device 101 of FIG. 1 or the electronic device 200 of FIG. 2 or FIG. 3.

Referring to FIG. 8, according to various embodiments of the disclosure, an electronic device (e.g., the processor 120 of FIG. 1, the connection terminal 178, the processor 300 of FIG. 3, or the USB connection terminal 310) may identify whether an external electronic device is connected via a USB cable in operation 801. According to an embodiment of the disclosure, the USB connection terminal 310 may recognize connection of the external electronic device (or a cable) based on at least one of a voltage, a current, or an impedance detected by a configuration channel (CC) pin (e.g., CC1 pin or CC2 pin).

According to various embodiments of the disclosure, if the electronic device (e.g., the processor 120 or 300, the connection terminal 178, or the USB connection terminal 310) is connected to the external electronic device (e.g., 'Yes' in operation 801), the electronic device may identify the state information of the external electronic device connected via the USB cable in operation 803. According to an embodiment of the disclosure, the processor 300 may identify information associated with the external electronic device via a CC pin of the USB connection terminal 310. For example, the information associated with the external electronic device may include at least one piece of information among the type of external electronic device, the manufacturer of the external electronic device, or the configuration of the external electronic device (e.g., the existence of a battery).

According to various embodiments of the disclosure, the electronic device (e.g., the processor 120 or 300, the connection terminal 178, or the USB connection terminal 310) may identify whether the external electronic device connected via the USB cable includes a battery in operation 805. According to an embodiment of the disclosure, the processor 300 may identify whether the external electronic device includes a battery by searching for the information related to the type of external electronic device via the memory 130 or a server. According to another embodiment of the disclosure, the processor 300 may identify whether the external electronic device includes a battery based on the information related to the configuration of the external electronic device obtained via the USB connection terminal 310.

According to various embodiments of the disclosure, if it is determined that external electronic device connected via a USB cable includes a battery (e.g., 'Yes' in operation 805), the electronic device (e.g., the processor 120 or 300, the connection terminal 178, or the USB connection terminal 310) may determine whether to change a power supplying scheme based on a monitoring result associated with the input voltage of at least one internal circuit in operation 807. According to an embodiment of the disclosure, if the external electronic device connected via the USB cable includes a battery, the processor 300 may determine that a power supplying scheme for the external electronic device is changeable in order to prevent an instantaneous voltage drop. For example, if it is determined that the power supplying scheme is changeable, the processor 300 may change, to the external electronic device, a subject that supplies power based on a result of monitoring the input voltage of at least one internal circuit, as described in operations 401 to 409 of FIG. 4. As another example, if it is determined that the power supplying scheme is changeable, the processor 300 may block power supplied to the external electronic device based on a result of monitoring the input voltage of at least one internal circuit, as described in operations 601 to 609 of FIG. 6.

According to various embodiments of the disclosure, an operation method of an electronic device (e.g., the electronic device 101 of FIG. 1 or the electronic device 200 of FIG. 2) may include an operation of supplying power to an external electronic device (e.g., the external electronic device 210 of FIG. 2) connected via a USB connector (e.g., the connection terminal 178 of FIG. 1 or the USB connection terminal 310 of FIG. 3), an operation of monitoring the input voltage of at least one internal circuit included in the electronic device, an operation of determining whether to change a power supplying scheme based on the identified input voltage if a voltage less than or equal to a reference voltage is detected via monitoring, and an operation of changing the power supplying scheme for the external electronic device if it is determined to change the power supplying scheme.

According to various embodiments of the disclosure, when the power supplying scheme for the external electronic device is changed, the operation method may further include an operation of maintaining a data communication scheme for the external electronic device.

According to various embodiments of the disclosure, the USB connector supports a type-C USB.

According to various embodiments of the disclosure, the operation of changing the power supplying scheme may include an operation of transmitting a request signal for changing the power supplying scheme to the external electronic device via a first pin among pins of the USB connector if it is determined to change the power supplying scheme, and, if a response signal is received via the first pin in response to the request signal, an operation of changing, to the external electronic device, a subject that supplies power.

According to various embodiments of the disclosure, the first pin may include a configuration channel (CC) pin or a side band use (SBU) pin.

According to various embodiments of the disclosure, the operation of transmitting the request signal may include an operation of transmitting, based on a baseboard management controller (BMC) protocol, a request signal for changing a power supplying scheme to the external electronic device.

According to various embodiments of the disclosure, the operation of changing the power supplying scheme may include an operation of blocking power supplied to the external electronic device if it is determined to change the power supplying scheme, and an operation of receiving power from the external electronic device.

According to various embodiments of the disclosure, the operation of determining whether to change the power supplying scheme may include an operation of identifying the number of voltage detection circuits that detect an input voltage less than a reference voltage among the at least one voltage detection circuit that monitors the input voltage of at least one element related to driving of the at least one internal circuit included in the processor, and, if the number of the voltage detection circuits that detect an input voltage less than the reference voltage exceeds a reference number, an operation of determining to change the power supplying scheme.

According to various embodiments of the disclosure, if the power supplying scheme is changed, the operation method may further include an operation of monitoring the input voltage of the at least one internal circuit, an operation of determining whether to change the power supplying scheme based on a result of monitoring, and, if it is determined to change the power supplying scheme, an operation of changing, to the electronic device, a subject that supplies power.

According to various embodiments of the disclosure, the operation method may further include an operation of identifying whether the external electronic device includes a rechargeable battery, and, if the external electronic device includes a rechargeable battery, an operation of determining that the power supplying scheme for the external electronic device is changeable.

While the disclosure has been shown and described with reference to various embodiments therefore, it will be understood by those skilled in the art that various changes in form and details may be made therein without departing from the spirit and scope of the disclosure as defined by the appended claims and their equivalents.

What is claimed is:
1. An electronic device comprising:
a battery;
a plurality of internal circuits;
a universal serial bus (USB) connector; and at least one processor operatively connected to the plurality of internal circuits and the USB connector, and including at least one element related to driving of the plurality of internal circuits and at least one voltage detection circuit monitoring an input voltage of each of the at least one element, wherein the at least one processor is configured to:
supply power to an external electronic device connected via the USB connector,
identify the input voltage of each of the at least one element via each of the at least one voltage detection circuit,
identify number of voltage detection circuits of which the identified input voltage is less than a reference voltage,
when the identified number of voltage detection circuits exceeds a reference number,
change a power supplying scheme for the external electronic device, and
in response to the change of the power supplying scheme, block power supplied to the external electronic device, and receive power from the external electronic device.

2. The electronic device of claim 1, wherein, when the power supplying scheme for the external electronic device is changed, the at least one processor is further configured to maintain a data communication scheme for the external electronic device.

3. The electronic device of claim 1, wherein the USB connector supports a type-C USB.

4. The electronic device of claim 1,
wherein, if the at least one processor determines to change the power supplying scheme, the USB connector is configured to transmit a request signal for changing the power supplying scheme to the external electronic device via a first pin among pins of the USB connector, and
wherein, if a response signal is received via the first pin in response to the request signal, the USB connector is configured to change, to the external electronic device, a subject that supplies power.

5. The electronic device of claim 4, wherein the first pin includes a configuration channel (CC) pin or a side band use (SBU) pin.

6. The electronic device of claim 1,
wherein, if the power supplying scheme is changed, the at least one processor is further configured to monitor an input voltage of the plurality of internal circuits,
wherein the at least one processor is further configured to determine, based on a result of the monitoring, whether to change the power supplying scheme, and
wherein, if the power supplying scheme is determined to be changed, the at least one processor is further configured to change, to the electronic device, a subject that supplies power.

7. The electronic device of claim 1, wherein the external electronic device includes a rechargeable battery.

8. A method of operating an electronic device, the method comprising:
supplying power to an external electronic device connected via a universal serial bus (USB) connector;
identifying an input voltage of each of at least one element related to driving of a plurality of internal circuits included in at least one processor of the electronic device via each of at least one voltage detection circuit included in the at least one processor;
identifying number of voltage detection circuits of which the identified input voltage less than a reference voltage;
when the identified number of voltage detection circuits exceeds a reference number,
changing a power supplying scheme for the external electronic device; and
in response to the change of the power supplying scheme, blocking power supplied to the external electronic device, and receiving power from the external electronic device.

9. The method of claim 8, further comprising:
when the power supplying scheme for the external electronic device is changed, maintaining a data communication scheme for the external electronic device.

10. The method of claim 8, wherein the changing of the power supplying scheme comprises:
if the power supplying scheme is determined to be changed, transmitting a request signal for changing the power supplying scheme to the external electronic device via a first pin among pins of the USB connector; and
if a response signal is received via the first pin in response to the request signal, changing, to the external electronic device, a subject that supplies power.

11. The method of claim 10, wherein the first pin includes a configuration channel (CC) pin or a side band use (SBU) pin.

12. The method of claim 8, further comprising:
if the power supplying scheme is changed, monitoring an input voltage of the plurality of internal circuits;
determining whether to change the power supplying scheme based on a result of the monitoring; and
if the power supplying scheme is determined to be changed, changing, to the electronic device, a subject that supplies power.

13. The method of claim 8, wherein the USB connector supports a type-C USB.

14. The method of claim 8, further comprising:
identifying whether the external electronic device includes a rechargeable battery, and,
if the external electronic device includes a rechargeable battery, determining that the power supplying scheme for the external electronic device is changeable.

* * * * *